US012286291B2

(12) United States Patent
Castro

(10) Patent No.: US 12,286,291 B2
(45) **Date of Patent: *Apr. 29, 2025**

(54) TRASH RECEPTACLE GARBAGE BAG DISPENSER

(71) Applicant: Deja S. Castro, Menifee, CA (US)

(72) Inventor: Deja S. Castro, Menifee, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,447

(22) Filed: Jun. 2, 2023

(65) Prior Publication Data

US 2023/0312235 A1 Oct. 5, 2023

Related U.S. Application Data

(63) Continuation of application No. 17/237,718, filed on Apr. 22, 2021, now Pat. No. 11,738,939, which is a continuation of application No. 16/419,708, filed on May 22, 2019, now Pat. No. 11,021,323, which is a continuation-in-part of application No. 14/854,913, filed on Sep. 15, 2015, now Pat. No. 10,370,187.

(60) Provisional application No. 62/112,465, filed on Feb. 5, 2015.

(51) Int. Cl.

| | |
|---|---|
| ***B65D 1/34*** | (2006.01) |
| ***B65B 43/14*** | (2006.01) |
| ***B65F 1/06*** | (2006.01) |
| ***B65F 1/16*** | (2006.01) |

(52) U.S. Cl.

CPC .............. *B65F 1/062* (2013.01); *B65B 43/14* (2013.01); *B65D 1/34* (2013.01); *B65F 1/068* (2013.01); *B65F 1/16* (2013.01); *B65F 2220/106* (2013.01)

(58) Field of Classification Search

CPC .. B65F 1/068; B65F 1/062; B65F 1/16; B65F 1/1415; B65F 1/06; B65F 1/1468; B65F 2220/106; B65F 2001/061; B65B 67/1233; B65D 88/1606; B65D 88/1612; B65D 88/1618

USPC ............ 248/95; 220/495.08, 495.09, 495.07, 220/495.1

See application file for complete search history.

(56) References Cited

U.S. PATENT DOCUMENTS

| | | | | |
|---|---|---|---|---|
| 3,603,542 | A * | 9/1971 | Grille ...................... | B65B 67/12 248/101 |
| 6,076,782 | A * | 6/2000 | Alderman ........... | B65B 67/1205 248/97 |
| 6,199,802 | B1 * | 3/2001 | Scheibe, Sr. .......... | B65F 1/1415 248/101 |

(Continued)

*Primary Examiner* — King M Chu

(57) ABSTRACT

A trash receptacle comprising an independent frame assembly, wherein the independent frame assembly has at least two parallel bars, wherein the bars are structurally configured to receive and dispense bags; and a clip mechanism located at the free non-affixed end of each bar, wherein each clip mechanism is configured to receive a bag so that the bag is pinched by the clip mechanism and the clip functions to prevent the bag from sliding off the bars or from collapsing inward. The trash receptacle is configured to be enclosed by placing the receptacle within at least one environment comprising at least one cabinet. The trash receptacle further comprising additional space to carry supplies in a cart configuration. The trash receptacle wherein the additional space comprises one of a cabinet, one or more drawers, one or more shelves, or one or more compartments. A trash receptacle on a cart.

23 Claims, 15 Drawing Sheets

(56) References Cited

U.S. PATENT DOCUMENTS

| | | | | |
|---|---|---|---|---|
| 2014/0216957 | A1* | 8/2014 | Orozco | A47K 17/00 206/216 |
| 2015/0048039 | A1* | 2/2015 | Laitila | B65B 67/1233 211/85.15 |

* cited by examiner

TRASH RECEPTACLE GARBAGE BAG DISPENSER

RELATED APPLICATION(S)

Under provisions of 35 U.S.C. § 120, the Applicant claims the benefit of U.S. non-provisional application Ser. No. 17/237,718, filed Apr. 22, 2021, which is incorporated herein by reference.

It is intended that the referenced application may be applicable to the concepts and embodiments disclosed herein, even if such concepts and embodiments are disclosed in the referenced applications with different limitations and configurations and described using different examples and terminology.

FIELD OF DISCLOSURE

The present disclosure relates, in general, to a trash receptacle structurally and functionally designed to ease the installation and removal of garbage bags.

BACKGROUND

Typical trash cans/receptacles allow for the installation of bags within and require removal that exposes the trash. Bag replacement could also take time as one would have to first remove the first bag (which would be full of trash) and then obtain and place a new bag in the trash can/receptacle. Removal is also hampered or made difficult as a result of having to lift the bag out of the trash can/receptacle.

People use trash bags at home and work but often find creative portable ways to bring them along. People tie them on door knobs at parties, tie them to the truck bed or side mirrors during a tail gate party. People also tie them to fences, railings, trees, tables, barbeques, chairs, etc. In doing so, they use regular shaped trash bags that may not, for the most part, be suitable or effective for their application. As such, people try to find ways to make the bags they use work for their use by hanging, clipping, tying or wrapping them around portable rims, stands, etc. However, they fail to find better ways to enable the efficient dispensing and installation of their trash bags.

Some typical grocery bag racks are also not able to hide the contents of the bags since the racks are not enclosed. These grocery bag racks cannot contain smells of their contents since they do not have lids. If spills occur from a ripped bag, the racks have difficulty containing the spill in an enclosed area since most grocery store bag racks have flat bases without fluid catching capability. Some bag racks that are in the grocery store checkout area are designed to allow the opening of grocery bags over a small area of space and thus are not able to accommodate a larger bag that would be able to hold a substantial amount of trash. Trash cabinets, bins, and all types of receptacles are enclosed and can hide the bag and the bag contents easily. Trash receptacles usually have a top or lid available to contain the smell of the trash. They usually have an enclosed bottom in case of a spill. However, they do not have an easy way to organize bags or allow for rapid bag changing. Most trash receptacles cannot accommodate bags with holes in them since they do not have rods in place to receive such bags.

Many businesses and homes have custom cabinetry or basic cabinet structures. Many companies have offered slide out flat base drawers to make room for a trash can to be set inside of that drawer. While this option can hide a trash can it does not offer the fast, clean, and organized method that an aspect of an embodiment of the present disclosure could offer by the simple conversion of adding two straight parallel bag holding bars or rods.

Most of the rods/bars that are found inside receptacles in prior art are used for different functions and are designed as such. Some prior art rods are used to hold the type of bags that are on a roll. In contrast, aspects of embodiments of the present disclosure contemplate the use of bags that may be in a stack and may remain inside a firm package while hanging and dispensing by holes that are in the bags (meant for dispensing the bags and also their installation). Most prior art rods are short in length, not able to allow one leading bag to be pulled away from the stack in the rear area of the receptacle and ride along into the center area of the receptacle, where it is in the fully open, ready to use position, where it needs continued firm support. The prior art is designed with obvious notches, or protruding clips on the bars for the user to open one bag at a time and position it by hand by clipping or hanging it into position. Most of the prior art, two bar or rod type of mechanisms, are shaped for the hanging of a grocery bag by the handle, so it can be used a second time as a trash bag. The prior art bars, because of their short length or shape do not allow a large quantity of bags to load nor do they offer the ability for one bag to open and move into the ready to use position. Many prior art receptacles have parallel bars in them; the bars are generally described as being part of the structure to keep the receptacle frame up and supported. Some of the prior art bars move and become like a blender or shredder inside a receptacle to disintegrate the trash. Some of the prior art parallel bars are used as tracks or rails for a plate or wall to move on so it can become a compactor.

Some prior art bars/rods are used to connect the lid to the pedal so they can function together to allow the lid to lift once the pedal is depressed. Almost all of the prior art parallel bars are connected at two opposite sides of the receptacle where they touch the opposite walls, therefore, not allowing someone access to one side in order to load on bags in a stack nor allow a full bag to be slid off of one free hanging side to exit the receptacle. Some prior art rods are "b" shaped or have significant curves at the free hanging end of the bar or rod where the bags are loaded and also large curves at the end which connects to the rear support wall. The problem with these curves is that they do not allow a tall, firm, thick package of bags (as needed for trash bag purposes), to be loaded onto the strongly curved end of the bar/rod easily and sometimes at all. Strong curves at the loading area of the bar or rod also require wasted time to manipulate the package onto the curves. The problem at the rear area of the prior art bar with the strong curves is that they do not allow the package to sit correctly or balance evenly. The strong "b" curve at the rear end that connects to the back wall area prevents the bags from easily deploying one by one. With these structural and design limitations, bags get snagged, torn, and stuck from the rear curve and cause major time delay in having to clean up or find ways to remove the bags efficiently. In contrast, for optimal utility an aspect of an embodiment of the present disclosure contemplates use of bars that may be straight from the free hanging loading area all the way to the connection area of the rear part of the bar.

Previous bag dispensing apparatuses are designed to be stationary and are not easily transported. They are also not marketed nor designed to be portable or designed to be attached to other surfaces for other purposes. These types of racks are specific to t-shirt handle style bags.

In light of the foregoing problems, there exists a need for a much more efficiently designed trash can/receptacle which enables speedier bag replacement, and maintains odor control among other things.

BRIEF OVERVIEW

An improved trash receptacle garbage bag dispenser may be provided. This brief overview is provided to introduce a selection of concepts in a simplified form that are further described below in the Detailed Description. This brief overview is not intended to identify key features or essential features of the claimed subject matter. Nor is this brief overview intended to be used to limit the claimed subject matter's scope.

The trash receptacle rack/bar or rod system as contemplated by the present disclosure, enable various utility options which may include, inter alia: 1. Adding lids to racks similar to the prior art of plastic bag grocery store racks to allow that function to now be "enclosed" and also used for trash purposes. 2. Creating an enclosure for straight parallel bar or rod bag hanging systems by adding walls around them or using them inside cabinetry to allow the bag and its contents to be out of plain view, and 3. Creating a new portable, adjustable, bag hanging bar or rod device for outdoors, indoors, that could be used anywhere people need a portable, two straight parallel bag hanging bar or rod device to load bags on with an optional lid. These options offer the same utility function while solving many unmet areas in life that are trash related. They all are designed for bags that hang from holes in them and need bars to allow them to load onto the bars, allow storing of a set of bags at the rear area of the bars, and allow the bags to be able to move along the bars to open for use and exit the bar or rod to be disposed of once they are full of trash. All of the functions and purposes as disclosed in this disclosure may be used with plastic bags that are for trash and bags that are for any purpose. The demands of the rods/bars for the purposes of this disclosure are structured and designed in order to function effectively and efficiently for the needs of a typical trash bag scenario.

One object of the present disclosure is to promote quick, smooth loading of a large set of generally tall bags. An aspect of an embodiment of the present disclosure provides a well fit bag to stay close to the rods so the bag does not sag at any point along the rods. A further aspect of an embodiment of the present disclosure allows the motion of removing the full bag to prompt the next bag, which is usually connected to the first bag, so it will smoothly deploy without any interference and without a person having to stop and manually place the next bag into position.

Aspects of embodiments of the present disclosure contemplate enabling the use of different bags including those that may be very flexible and thin which may be easily loaded onto bars/rods as the bags are not loaded while inside of a package and because the shape of the bag and hole alignment is easy to manipulate by hand in order to load them onto the bars. The free hanging rods/bars contemplated in the present disclosure also allow for the bags to be easily loaded onto the rods/bars and to dispensing the bags for use. In an aspect of an embodiment of the present disclosure, the bars/rods may be generally straight with a minor curve to facilitate loading the bags or keep the bag from easily falling or sliding off the bars/rods.

An aspect of an embodiment of the present disclosure contemplates a trash receptacle that eases the installation and removal of garbage bags while also maintaining odor control, among other distinct advantages. An aspect of an embodiment of the present disclosure contemplates a trash receptacle which may include a compartment enclosed by walls of the trash receptacle, where the compartment may be an enclosure configured to receive trash, two planar horizontal bars or rods which may be parallel with each other within the compartment, where the bars or rods may be structurally configured to receive and dispense garbage bags, and a lid over the compartment, the lid providing access into the compartment. The lid, or top surface of the receptacle can be solid, or with an opening such as a top drop style. The door can allow easy trash deposit by being a swing or flip style door, if desired. Any type of opening can be used to deposit trash. In one aspect of an embodiment of the present disclosure, the bars may be affixed within the compartment. An aspect of an embodiment of the present disclosure contemplates a trash receptacle apparatus that could be used in cabinets, stands, racks, etc. having an enclosed set(s) of parallel bars that are used to hang and move bags on. Another aspect contemplates a portable device that may be enclosed if desired. It should be noted that the term "enclosed" can, inter alia, refer to adding a lid to close off the top of a bag that is hanging on the bars of any type of bag rack; a user can "enclose" a bag by using a lid without walls if desired. The term "enclosed" can also refer to enclosing the bag that hangs on bars by adding walls of any material and an optional door at any location along with the lid if desired. An aspect of an embodiment of the present disclosure contemplates a trash receptacle apparatus having straight parallel rods/bars in order to enable fast easy loading of thick, firm, and tall packages of very large bags, and easy pull deployment without any interference of curves in the rear or front end of the rod/bars. One aspect of an embodiment of the present disclosure contemplates having minor curves for style that do not slow down loading, dispensing, and removing the bags.

An aspect of an embodiment of the present disclosure contemplates multiple sets of rods/bars that may be used inside one receptacle/cabinet so that many bags can be used at one time. The bags can be used for recycling, compost, trash, etc. all at one location. The rods/bars with bags can be all in one compartment or have dividers to create separate compartments.

In an aspect of an embodiment of the present disclosure, one end of each bar or rod may be secured to an inside wall of the compartment. In an aspect, each other end of each bar or rod be free hanging and unsupported/non-affixed. As such, garbage bags may be installed onto the bars or rods by way of the free hanging, unsupported ends of the bars. In an aspect of an embodiment of the present disclosure, access to the receptacle compartment for installing garbage bags may be made possible by way of any one of a front door, side door or the lid.

In an aspect of an embodiment of the present disclosure, the bars or rods may be structurally configured to hold garbage bags in a stack.

In an aspect of an embodiment of the present disclosure, the bars or rods may be structurally configured to receive and dispense garbage bags with punch holes. In operation, a user may draw a garbage bag which, in turn may be connected to another garbage bag. The drawn garbage bag, because of the user's pull, is drawn open. The punch holes enable detachment from other bags when the bag is drawn by the user.

In an aspect of an embodiment of the present disclosure, the trash receptacle may further include a drip tray/pan located at the base of the compartment.

In an aspect of an embodiment of the present disclosure, the bars or rods may be secured to any one of the following: any wall of the compartment, lid of the receptacle, floor/base of the receptacle, frame of the receptacle, door of the receptacle, ceiling of the receptacle.

In an aspect of an embodiment of the present disclosure, the bars or rods may be can be on a track/rail system where the track/rail system enables the bars or rods for motion in any one of the following directions within, and in relation to, the compartment: up, down, side to side or front to back.

In an aspect of an embodiment of the present disclosure, the bars or rods may be affixed to a panel within the compartment. This panel, according to another aspect of an embodiment of the present disclosure, may include multiple sets of attachment positions to enable bar or rod attachment settings at different heights.

In an aspect of an embodiment of the present disclosure, the panel may include a track to which the bars may be secured to or affixed and where the track is able to vertically slide up or down the panel to enable different bar or rod setting heights. In an aspect of an embodiment of the present disclosure, the bars or rods may have a bag position holding mechanism that keeps the bag from moving backwards/collapsing or from moving forward/falling off the bars.

In an aspect of an embodiment of the present disclosure, the receptacle may include a clip mechanism at each free non-affixed end of each bar, where each clip mechanism is configured to receive the edge of an installed bag and functions to help detach the bag. The clip mechanism also prevents the installed bag from sliding off the bars. In an aspect of an embodiment of the present disclosure, the clip/clasp mechanism could be any size, material; it could be molded onto the bars, attached as a separate piece, it could be any shape, etc. The clip mechanism is for the purpose of keeping the bag in a set position so it cannot close inward or fall off. In another aspect of an embodiment of the present disclosure, the clip/clasp mechanism may be located on the bars/rods-top side, left of right sides, the bottom side or be on the outside front edge/tip of the bar/rod.

In an aspect of an embodiment of the present disclosure, the edge of a bag near the free hanging part of the parallel bars may be kept in position firmly, by being held in/by any one of a recessed area, slot, indentation, cutout, narrowing in the bars/rods themselves or in an material that covers the bar. This configuration prevents the bag from falling off the bars or collapsing inward. The recessed area, slot, indentation, cutout, narrowing in the bars/rods that catches the edge of the bag can be made on the top, left or right sides, or bottom of bars/rods and also the front edge of the bar.

In an aspect of an embodiment of the present disclosure, the edge of the bag near the free hanging part of the parallel bars may be kept in position while being held by one or more protruding pieces on the bars themselves so the bag will not fall off the bars or collapse inward. The protruding pieces may have any shape or size and may be located on the top side, left or right sides, the bottom side, or the front edge of the bars. The protruding pieces may be attachable or molded into the bars and they may depress for easy loading of the bags if desired.

In an aspect of an embodiment of the present disclosure, the bars may be affixed to a cross bar or rod which is attached to sides of the compartment.

In an aspect of an embodiment of the present disclosure, the trash receptacle may further include an adjustable base located within the compartment where the adjustable base may be adjusted for different heights within the compartment. The adjustable base may be lowered to enable trash to sink down for easy bag removal off the bars. The movement of the trash downward also allows easy closure of the bag, less spilling of trash, etc. In another aspect, the adjustable base may be structurally configured to lower itself with the weight of the contents within the bag.

In an aspect of an embodiment of the present disclosure, the bars of the trash receptacle are detachable.

In an aspect of an embodiment of the present disclosure, the bars of the trash receptacle may have a slight concave curve between the affixed end of each bar or rod and the free end of each bar. This configuration enables an installed bag to hang easily between each ends of the bars, and prevents the installed bag from slipping off the bars Another aspect of an embodiment of the present disclosure contemplates a trash receptacle which may include a compartment enclosed by walls of the trash receptacle, where the compartment may be configured to receive trash, an independent frame assembly which may be releasably secured within the compartment, where the independent frame assembly may be structurally configured to releasably receive two parallel and planar horizontal bars. In one aspect, these bars or rods may be structurally configured to receive and dispense garbage bags. The receptacle may also include a lid over the compartment, the lid providing access into the compartment.

Another aspect of an embodiment of the present disclosure contemplates a trash receptacle which may include a compartment enclosed by walls of the trash receptacle, where the compartment may be configured to receive trash, an independent frame assembly which may be releasably secured within the compartment, two parallel and planar horizontal bars, which may be affixed to the independent frame assembly, where the bars or rods are structurally configured to receive and dispense garbage bags and a lid over the compartment, the lid providing access into the compartment.

In another aspect of an embodiment of the present disclosure, the bars of the trash receptacle may be releasably affixed to the independent frame assembly.

In another aspect of an embodiment of the present disclosure, the independent frame assembly may include a base having any one of: a track, sliding mechanism or wheels for sliding the independent frame assembly out of the compartment.

In another aspect of an embodiment of the present disclosure, the bars of the trash receptacle may include a clip mechanism at each free non-affixed end of each bar, where each clip mechanism is configured to receive the edge of an installed bag and functions to help detach the bag and where the clip mechanism prevents the installed bag from sliding off the bars.

In another aspect of an embodiment of the present disclosure, the independent frame assembly may be placed within a general home/office cabinet to create a receptacle. In another aspect of an embodiment of the present disclosure, the bars of the trash receptacle may be slightly curved between an affixed end of each bar or rod and a free end of each bar.

In another aspect of an embodiment of the present disclosure, one end of each bar or rod may be secured to the independent frame assembly and each other end of each bar or rod may be free hanging—which, in one aspect, enables installation of garbage bags by way of the free hanging ends of the bars.

In another aspect of an embodiment of the present disclosure, the independent frame assembly may be a vertical piece that may be releasably secured to the base of the compartment.

In another aspect of an embodiment of the present disclosure, access to the compartment for installing garbage bags may be made possible by way of any one of a front door, side door or the lid.

In another aspect of an embodiment of the present disclosure, the bars or rods may be on a track/rail system of the independent frame assembly where the track/rail system enables the bars or rods for motion in any one of the following directions within, and in relation to, the compartment: up, down, side to side or front to back.

A further aspect of an embodiment of the present disclosure contemplates a trash receptacle having a floor/base that can be elevated and stable while in use and when the bag is full it can be lowered by any means (pedal pushing, using your foot to depress it, etc.) then as the full bag is lowered the trash will sink down into the extra bag material that usually unfolds from the bottom of the bag at that time so there is more room to tie the top. This way the trash will not overflow while being removed from the bars and the bag material at the top will now be long enough to be tied.

A further aspect of an embodiment of the present disclosure contemplates a bag dispensing apparatus, which may include a horizontal cross bar, pair(s) of co-planar bars perpendicularly affixed to the horizontal cross bar, where each pair(s) of co-planar bars may be configured to receive and dispense bag(s), and an attachment structure, coupled to the horizontal cross bar or rod where the attachment structure may be configured to attach the apparatus to a desired location.

In a further aspect of an embodiment of the present disclosure, the bag dispensing apparatus may also include a lid, configured to be positioned over a bag hung by the pair(s) of co-planar bars.

In a further aspect of an embodiment of the present disclosure, the bag dispensing apparatus may also include a clip mechanism at each free non-affixed end of each bar or rod of each pair(s) of co-planar bars. In one aspect, each clip mechanism may be configured to receive the edge of the bag. The clip mechanism also functions to help detach the bag and prevents the installed bag from sliding off the bars.

In a further aspect of an embodiment of the present disclosure, the attachment mechanism/structure may be any one of: magnets, bolts, clip on, tie downs, welding, adhesives, hook and loop, screws, glue, twist on apparatus, threading, molding, hooks, suction device, snap on configuration, pinning, snap ring, nailing, hanging, pop in device.

In a further aspect of an embodiment of the present disclosure, the horizontal cross bar or rod may be collapsible. This enables the apparatus to be portable.

In a further aspect of an embodiment of the present disclosure, the apparatus may also include a drip pan, which may be positioned at the base of the bag.

In a further aspect of an embodiment of the present disclosure, the bag dispensing device may be placed within a general home/office cabinet to create a receptacle.

In a further aspect of an embodiment of the present disclosure, the bag dispensing apparatus may also include a clip mechanism located near a free non-affixed end of each bar and located parallel to the bars, wherein each clip mechanism may be configured to receive a bag so that the bag may be pinched by the clip mechanism and the clip functions to prevent the bag from sliding off the bars or from collapsing inward.

In a further aspect of an embodiment of the present disclosure, the trash receptacle comprising: An independent frame assembly, wherein the independent frame assembly has at least two parallel and planar horizontal bars, wherein the bars are structurally configured to receive and dispense bags; and a clip mechanism located near a free non-affixed end of each bar and located parallel to the bars, wherein each clip mechanism is configured to receive a bag so that the bag is pinched by the clip mechanism and the clip functions to prevent the bag from sliding off the bars or from collapsing inward.

In a further aspect of an embodiment of the present disclosure, the trash receptacle further comprising additional space to carry supplies as a cart. In a further aspect of an embodiment of the present disclosure, the trash receptacle further comprising a lid. In a further aspect of an embodiment of the present disclosure, the trash receptacle further comprising a drip/tray/pan.

In a further aspect of an embodiment of the present disclosure, a bag dispensing apparatus, comprising; a horizontal cross bar wherein the horizontal cross bar is able to be attached to a desired location; at least a pair of co-planar bars perpendicularly affixed to the horizontal cross bar, wherein each at least pair of co-planar bars are configured to receive and dispense at least one bag; and a clip mechanism located near a free non-affixed end of each bar and located parallel to the bars, wherein each clip mechanism is configured to receive a bag so that the bag is pinched by the clip mechanism and the clip functions to prevent the bag from sliding off the bars or from collapsing inward.

In a further aspect of an embodiment of the present disclosure, a bag dispensing apparatus, comprising; at least two parallel bars wherein the at least two parallel bars each have one end that is able to affix to a surface and a clip mechanism located near a non-affixed end of each bar and located parallel to the bars, wherein each clip mechanism is configured to receive a bag so that the bag is pinched by the clip mechanism and the clip functions to prevent the bag from sliding off the bars or from collapsing inward.

Additional aspects, objectives, features and advantages of the present disclosure will become apparent from the following description of the preferred embodiments with reference to the attached drawings.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicant. In addition, the drawings may contain other marks owned by third parties and are being used for illustrative purposes only. All rights to various trademarks and copyrights represented herein, except those belonging to their respective owners, are vested in and the property of the Applicant. The Applicant retains and reserves all rights in its trademarks and copyrights included herein, and grants permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure. In the drawings.

DETAILED DESCRIPTION

Figure 1:
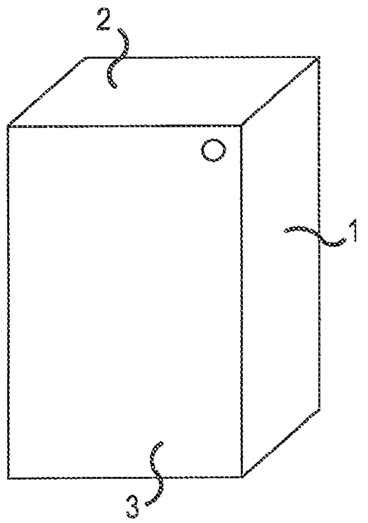
FIG. 1 illustrates a view showing the receptacle with its lid and front door closed according to an aspect of an embodiment of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims. The present disclosure contains headers. It should be understood that these headers are used as references and are not to be construed as limiting upon the subjected matter disclosed under the header.

All publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an opening" can include two or more openings.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to manufacture the disclosed devices, systems, and articles of the disclosure as well as the devices themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the disclosure. Thus, if there are a variety of additional steps that can be performed it is understood that each of these additional steps can be performed with any specific aspect or combination of aspects of the methods of the disclosure.

It is understood that the devices and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

In a certain aspect of an embodiment of the present disclosure, the trash receptacle or trash can (terms "can", "trash can", "receptacle", "trash receptacle" being used interchangeably throughout this disclosure) be particularly made for trash bags that have holes punched in them that they hang by. The bags hang, move and function simply by hanging on two preferably straight parallel bars/poles/sticks that can be made from any material. In one aspect of an embodiment of the present disclosure, the bars or rods may have minor curves. These parallel bars or rods may connect to one side of the wall in the trash receptacle and do not need to connect to anything for support at the sides or the end where the bag slides off. They basically connect for support to one wall and free hang straight out. The bars or rods are enclosed within the trash can/receptacle and may run from the back area of the receptacle horizontally towards the front area of the receptacle.

In one aspect, the bars, while usually being parallel, could be offset bars or rods and can be of any length, thickness or made out of any material. Additional aspects of embodiments of the present disclosure contemplate the bars or rods having a variety of textures and/or features that will enable trash bags to be smoothly installed/removed and/or prevent the bags from falling off the front of the bars or rods while the bags are in a "ready to use" position. For instance, the ends of the bars or rods may have a rubber texture which may grip the bag and prevent it from slipping off.

The trash receptacle, as contemplated in one aspect, is made to be enclosed with access being provided in a number of ways via including a front door, side door or any way desired to provide access to the trash bags for their loading and unloading. The can/receptacle may also be made of any material and be of any size, color and/or shape having a lid. The can/receptacle may be adapted for use in numerous settings including household, industrial, commercial fast food, within cabinets etc.

Aspects of embodiments of the present disclosure are distinguished from other trash cans/receptacles or stands which use bags which are clipped into position, or are "wrapped" around a rim of any shape whether circular or square etc. or made to use with grocery store "handled bags" aka t-shirt bags will not work in the trash can/receptacle contemplated in the present disclosure. In contrast, the contemplated disclosure enables loading of the bags onto the bars or rods by way of holes/openings in them. The bags do not wrap around or over the bars or rods but rather slide onto the bars or rods and hang on them. The bags may be able to move into a ready-to-use, open position by moving the bag along the bars or rods from the rear area of the trash can/receptacle towards the front middle area of the can/receptacle while they unfold or expand so they are ready to receive waste/trash. When the bags are full, they may be pulled off the bar or rod by sliding them towards the front of the receptacle until they fall off the bars. The next bag usually will be pulled towards the front from the rear area as it begins to open for use.

One aspect of an embodiment of the present disclosure contemplates an enclosed trash can/receptacle that can have a lid. It can have different style doors but will have some sort of opening to access the bag and allow it to be pulled horizontally off the bars or rods to allow the next bag on. This configuration is distinct from the prior art as any type of stand cannot function the same way because prior art cans/receptacles expose the bag of trash out in the open and do not keep the trash enclosed for sanitary or esthetic reasons.

The bars or rods can be installed/secured to the can/receptacle in a number of ways, including, but not limited to, any wall of the receptacle, the roof of the receptacle, the lid of the receptacle, the floor/base of the receptacle, the frame of the receptacle, door of the receptacle. In one aspect, the bars or rods may be attached or secured to a separate piece which in turn may be attached to the receptacle by being mounted or bracketed to the receptacle. Such a piece may be vertical in structure/alignment and may have the bars or rods secured to it at a right angle. In another aspect, the bars or rods may be installed on a track/rail system that would enable motion in an up, down or sideway direction. Methods of securing/attaching the bars or rods may include, but not be limited to, welding, using: adhesives, hook and loop, screws, bolts, glue, magnets, clips, twist on apparatus(es), threading, molding, hooks, suction device(s), snap on configuration(s), pinning, snap ring mounting, nailing, pop in configuration(s), hanging, etc. Methods may further include a fastening means/an adhering means comprising at least one of: magnets, bolts, clip on, tie downs, welding, adhesives, hook and loop fasteners, screws, glue, twist on apparatus, threading, molding, hooks, suction device, snap on configuration, pinning, hanging, snap ring, nailing, pop in device, In configurations where the receptacle has a side access door, the bars or rods may be installed to run horizontally from one side towards the other side of the receptacle as opposed to the back to front direction as previously discussed.

In sum, an aspect of an embodiment of the present disclosure contemplates an enclosed trash can for privacy/hiding of a trash bag with two internal parallel free floating (attached at one end) horizontal bars or rods that are made for trash bags that have holes in them, so they can free hang on those parallel bars or rods for use and removal.

Advantages of the present disclosure include:

- Having trash bags readily available for use following removal of a previous bag.
- Increased trash bag changing speed
- Enabling use of bags that have holes in them to hang them by
- Increased privacy
- More efficient/effective odor control
- Elimination of the time it takes to hang bags on clips or fold/secure onto rims
- Being specially designed to handle the specially designed bags that hang on bars or rods despite having an outward normal trash can/receptacle appearance.
- Enabling the loading of a large quantity of trash bags that may be in a stack/package and are enabled to be dispensed one after another.
- Enabling the removal of a full bag horizontally off the bars or rods which eliminates the need to vertically lift a full bag out of the can/receptacle.

Optional aspects of embodiments of the present disclosure contemplate having the can and rods sold separately or together. Other aspects contemplate the trash can/receptacle presented as one piece where the bars or rods are already molded into place. Additional aspects contemplate retrofit configurations—i.e. where existing cans/receptacles may be retrofitted to include the aforementioned bars.

Further aspects contemplate including a drip tray/pan at the base of the can/receptacle to catch any fluid that may leak from the bags. For additional support, when and where needed, additional rods or bars or rods may also be included.

Referring now to FIG. 1 a trash receptacle 1 is shown according to an aspect of an embodiment of the present disclosure. Trash receptacle 1 may have a lid 2 for covering the bag within the receptacle. In one aspect of an embodiment of the present disclosure, receptacle 1 may also include a door 3 for providing access into receptacle 1 in order to install or remove full trash bags.

Figure 2:
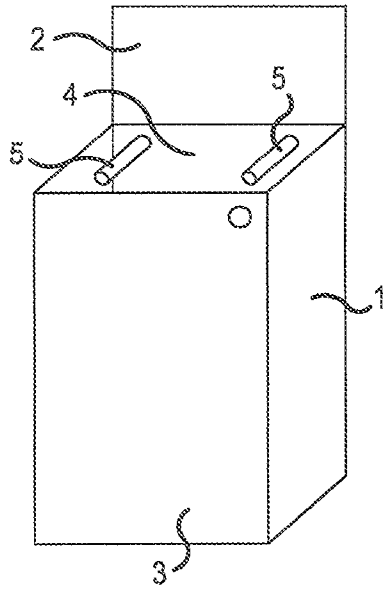
FIG. 2 illustrates a view showing the receptacle with a lifted lid, and bars or rods that hold the trash bags, according to an aspect of an embodiment of the present disclosure.

Referring now to FIG. 2 receptacle 1 is shown with its lid 2 being lifted up to reveal interior hidden bars or rods 5 that hold the trash bags within compartment 4 of receptacle 1, according to an aspect of an embodiment of the present disclosure. Receptacle 1 may have two "straight" parallel bars or rods 5 inside an enclosed receptacle/cabinet 1 that can be used by connecting them various ways in addition to the rear wall of receptacle 1.

Figure 3:
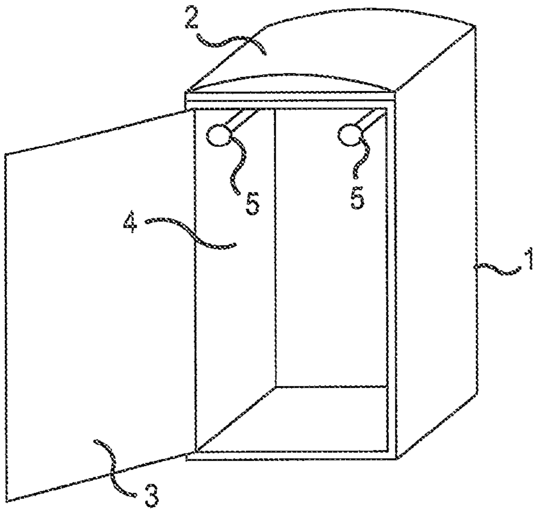
FIG. 3 illustrates a view showing the receptacle with a closed lid, and a front door open to reveal the hidden bars or rods according to an aspect of an embodiment of the present disclosure.

Referring now to FIG. 3 receptacle 1 is shown with its lid 2 closed and its front door 3 open to reveal hidden bars or rods 5 according to an aspect of an embodiment of the present disclosure.

Figure 4:
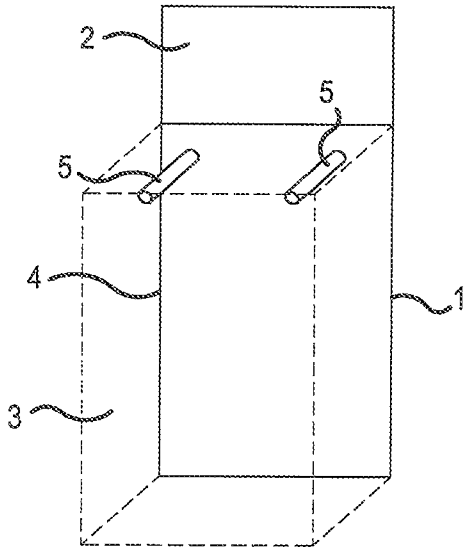
FIG. 4 illustrates a view showing the receptacle with a lifted lid and showing how the receptacle would look without its sides and front door according to an aspect of an embodiment of the present disclosure.

Referring now to FIG. 4 receptacle 1 is shown with lid 2, bars or rods 5 and compartment 4 according to an aspect of an embodiment of the present disclosure.

Figure 5:
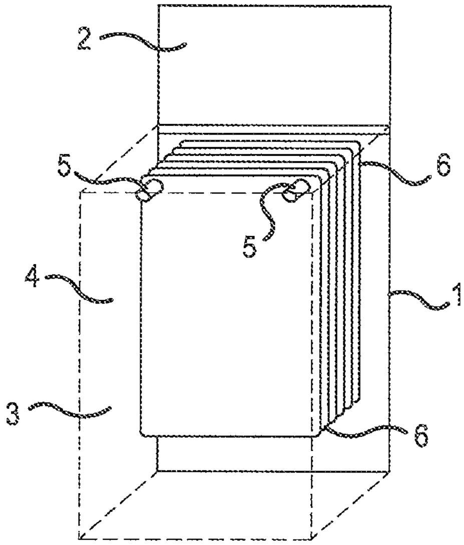
FIG. 5 illustrates a view showing the receptacle with a lifted lid and showing how the receptacle would look with the trash bags stacked in place without the receptacle's walls and front door according to an aspect of an embodiment of the present disclosure.

Referring now to FIG. 5 receptacle 1 is shown with lid 2 lifted up and with a folded stack of trash bags 6 in place without the receptacle's walls (for emphasis) and front door according to an aspect of an embodiment of the present disclosure.

Figure 6:
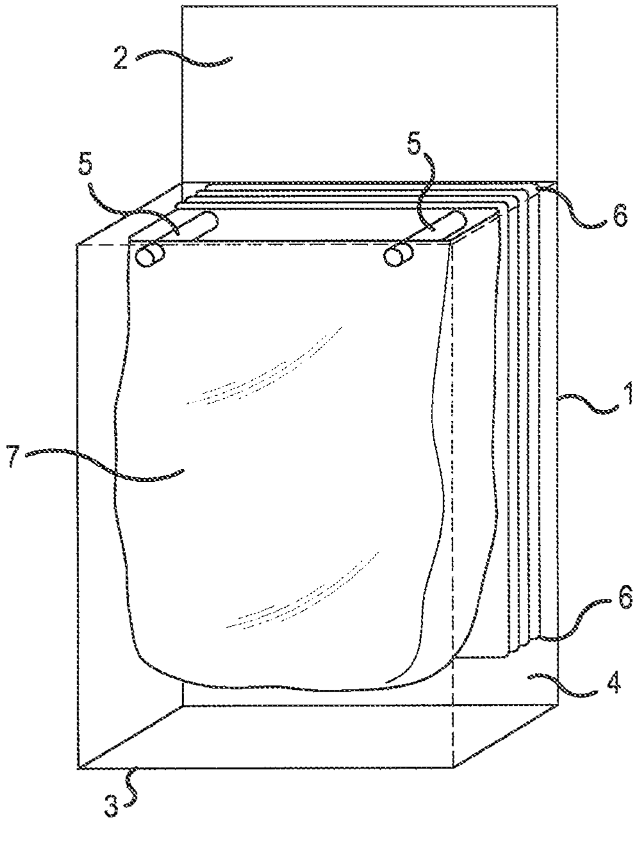
FIG. 6 illustrates a view showing a trash receptacle having a first bag in the fully open position ready to receive trash and showing the receptacle with its lid lifted up and how the receptacle would look without the receptacle sides and front door according to an aspect of an embodiment of the present disclosure.

Referring now to FIG. 6 receptacle 1 is shown with a first bag 7 in the fully open position ready to receive trash and showing receptacle 1 with lid 2 lifted up according to an aspect of an embodiment of the present disclosure.

Aspects of embodiments of the present disclosure contemplate straight parallel bars or rods 5 that can free hang on one side, are long enough to allow a large quantity of bags 6 to load and remain supported while expanding across receptacle 1. Certain aspects of embodiments or the present disclosure also contemplate bars or rods 5 that are smooth enough for a bag 7 with holes to slide from the loaded position into the ready to use position and then off the free hang portion to exit the bar or rod 5 when full. Bars or rods 5 do not require a user to load on one bag at a time by wrapping it around the top like a ring or rim. They also do not require a user to clip each side into position, or hang the bag by its handles if applicable. Bars or rods 5 are located towards the top area of receptacle 1 to facilitate the bag to hang by its holes and extend down into receptacle 1's compartment 4 where it fills up with trash or items. In an aspect of an embodiment of the present disclosure bars or rods 5, may have simple minor curves to ease loading and help keep bag 7 or bags 6 on, but do not have any curves that interfere with the utility function of easy loading and snag free deployment.

Certain aspects of embodiments of the present disclosure, when used in the commercial setting and even household kitchens, may require bags that are much larger and thicker than grocery store bags. Bags with a thick enough gauge to hold in fluid and shaper items are difficult to fold and keep in a tight position. These bags must be able to stay close to the bar or rod which means a smaller diameter hole in them to hang on the bar or rod with. The bags must be able to expand long enough to accommodate a large amount of trash and also have room at the top to tie closed. A firm package must be used to keep small holes in alignment to load onto bars. Firm boxes and packages do not allow much flexibility and do not work with strong curves or "b" shaped pins/rods. Packaging must be long enough to hold a large bag but short enough to not allow the new bags to be soiled by touching the bottom area of the current used bag which can leak. In order to keep large trash bags folded and tight a package is needed versus just a stack of individual bags at the rear area of a rack. It is not practical to use loose bags without firm large packages; the bags are not orderly and unfold inconveniently. Aspects of embodiments of the present disclosure address the specifics of using rods inside a receptacle that can handle the type of movement and packaging needed to use very large bags in order to create a useful product. Bars or rods 5 have the ability to offer various features, rubber or other gripping material on the bars or rods to keep bag from sliding, a low-profile clip mechanism to maintain bag position once it is deployed so it cannot accidently close while in use etc. Such features allow the speed of the bag to be controlled and can allow the bag to hold its position very well while in use.

In aspects of embodiments of the present disclosure, the bars or rods 5 may be straight at their connection point with receptacle 1 and at the free hang ends. Bars or rods 5 allow loading of a firm tall package or even box that can hold very large bags that are preferably folded up from the bottom and bags that also have small holes for their installation), so they stay close to the bar or rod to avoid sagging.

Sagging allows a gap between the bar or rod and the sides of the bag which allows items to land outside of the bag. Other aspects contemplate bars or rods or rods that are slightly curved between their connection point and their free ends. This configuration enables securing a bag in place by preventing it from slipping of the pair of bars or rods or rods.

With small holes that fit well to the poles there is a problem with "b" shaped pins, as disclosed in some prior art, since one cannot maneuver a large, tall, thick, firm pack or box of bags onto the loading end of a "b" shaped pin, there isn't enough clearance from the back wall of the receptacle to maneuver the package past the large curve that leads the package upward to get it onto the straight part of the bar. The second problem with the "b" shape pin is that the area the package sits along the rear wall can get stuck in that curve. It is also difficult for the next bag to get over that curve in order to have a smooth deployment. These details are important especially since the type of bag the present disclosure will use will make the bag depend on the first used bag to successfully pull the second bag smoothly into the ready to use position, without the user having to touch the second bag. These types of bags preferably are connected to each other and that is how they can pull each other into place.

Figure 7A:
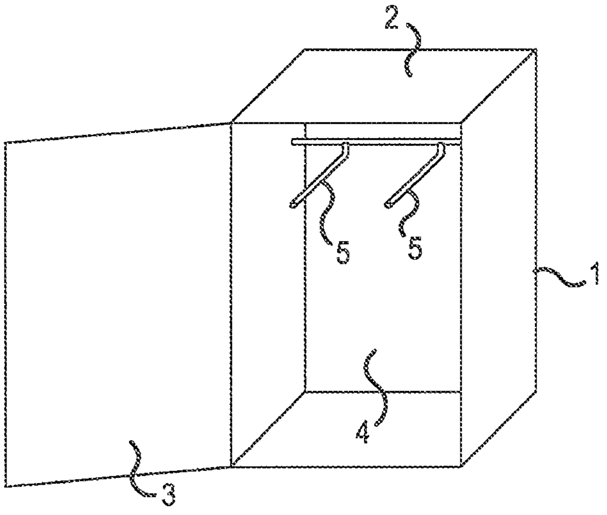
FIG. 7A illustrates a trash receptacle having rods of the receptacle being attached to a cross bar that connects on the side walls with no contact to the rear wall, according to an aspect of an embodiment of the present disclosure.

Referring now to FIG. 7A trash receptacle 1 is shown having bars or rods 5 of receptacle 1 being attached to a cross bar that connects with receptacle 1's the side walls according to an aspect of an embodiment of the present disclosure. In this aspect, bars or rods 5 do not connect with receptacle 1's rear wall.

Aspects of embodiments of the present disclosure contemplate bars or rods 5 being attached to different parts of receptacle 1 including lid 2, walls of receptacle 1, base/floor of receptacle 1, and door 3 which can slide out or be on a hinge. Bars or rods 5 may be on a track that can be installed on the back wall of receptacle 1 or as used on an independent item such as a hanging mechanism. In another aspect, the user can have a bag stand that will fit into the receptacle to create an "enclosed" system by combining the two products. Some of these aspects may be seen in FIG. 7B through FIG. 10. In one aspect of an embodiment of the present disclosure, the stand may be collapsible or foldable for easy storage or transport if desired.

Figure 7B:
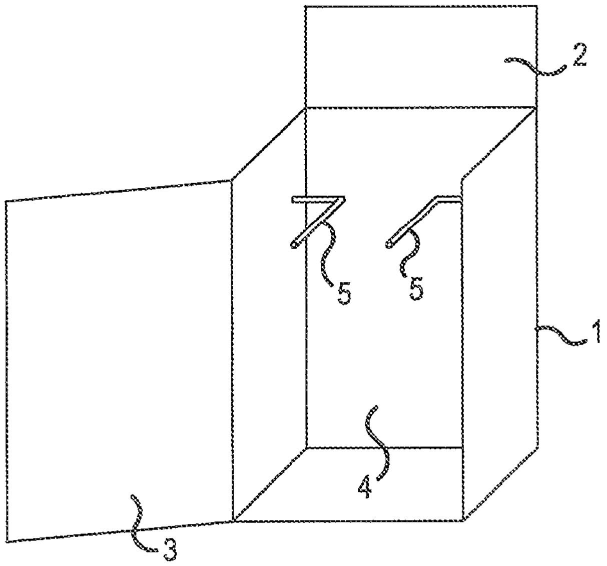
FIG. 7B illustrates a trash receptacle having rods of the receptacle being independently connected directly to only the side walls of the receptacle according to an aspect of an embodiment of the present disclosure.

FIG. 7B illustrates another aspect of an embodiment of trash receptacle 1 having bars or rods 5 being independently connected directly to only the side walls of receptacle 1

Figure 8A:
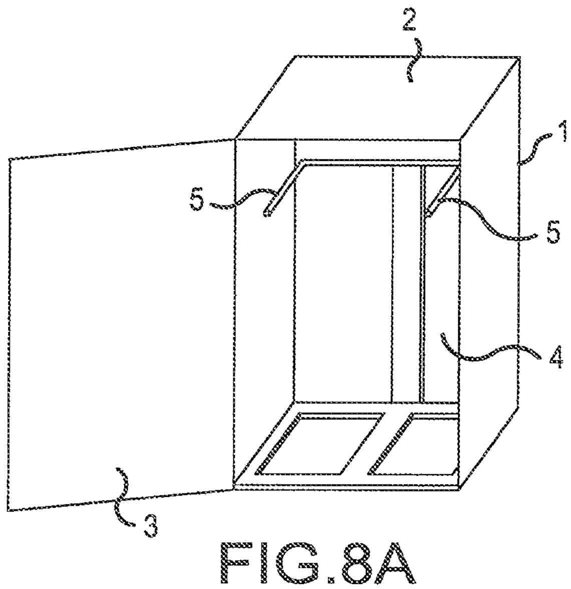
FIG. 8A illustrates a trash receptacle having rods of the receptacle being attached to a vertical bar that connects to the floor/base inside the receptacle according to an aspect of an embodiment of the present disclosure.

Referring now to FIG. 8A trash receptacle 1 is shown with bars or rods 5 being attached to a vertical frame that connects to the floor/base inside receptacle 1 according to an aspect of an embodiment of the present disclosure.

Figure 8B:
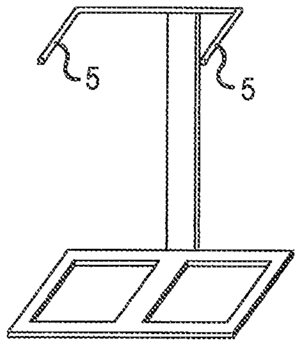
FIG. 8B illustrates a trash receptacle having rods of the receptacle on an independent trash rack/stand that can be placed inside a receptacle to provide an enclosure for it according to an aspect of an embodiment of the present disclosure.

Referring now to FIG. 8B bars or rods 5 of receptacle 1 are shown as part of an independent trash rack/stand that can be placed inside a receptacle according to an aspect of an embodiment of the present disclosure.

Figure 9:
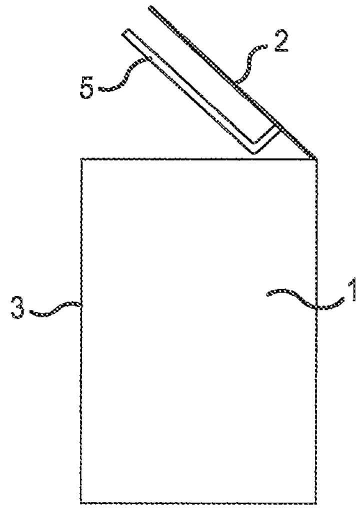
FIG. 9 illustrates a side view of a trash receptacle having two straight parallel rods attached at the ceiling or lid of the receptacle according to an aspect of an embodiment of the present disclosure.

Referring now to FIG. 9, a side view of trash receptacle 1 is shown with two straight parallel rods 5 attached at ceiling or lid 2 of receptacle 1 according to an aspect of an embodiment of the present disclosure.

Figure 10:
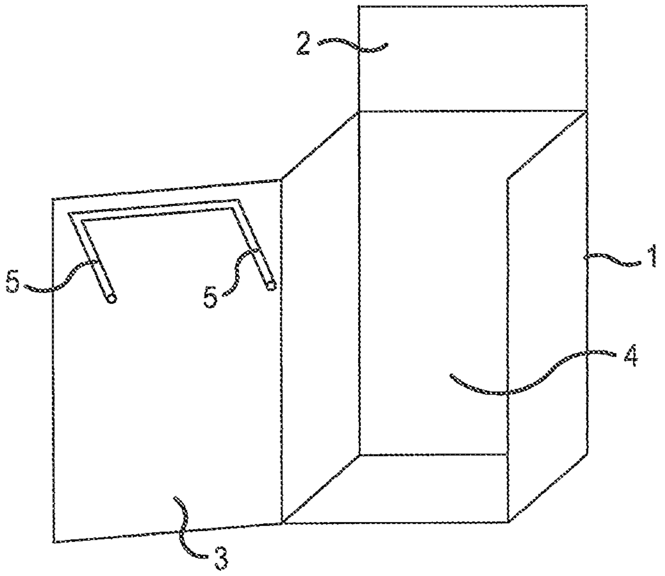
FIG. 10 illustrates a trash receptacle having rods attached to the receptacle door which can open with a hinge or slide out mechanism according to an aspect of an embodiment of the present disclosure.

Another placement configuration for bars or rods 5 may be seen in FIG. 10 where bars or rods 5 are attached to receptacle door 3 which can open with a hinge or slide out mechanism according to an aspect of an embodiment of the present disclosure.

Figure 11:
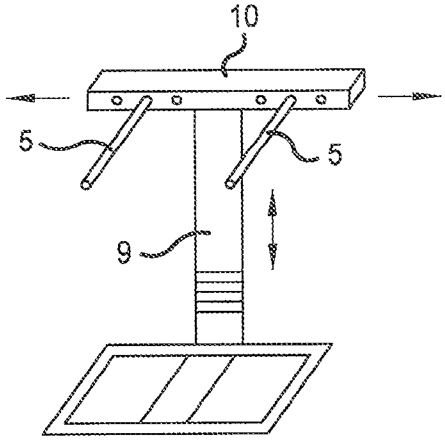
FIG. 11 illustrates an independent frame assembly/rack/stand having an adjustable two straight parallel bar stand with a track that can move up and down and side to side, the bars can move in any direction, stand can have extra holes to move the bar if desired according to an aspect of an embodiment of the present disclosure.

Referring now to FIG. 11 trash receptacle 1 may be seen having an adjustable two straight parallel bar stand 9 that has a track 10 that can move up and down and side to side by any means, according to an aspect of an embodiment of the present disclosure. Bars or rods 5, being connected or affixed to slots within track 10, can move in any direction, the width between the bars or rods may be widened by placing each respective bar in a different slot or extra holes of track 10 and the height may also be adjusted by either lowering or elevating track 10.

Figure 12:
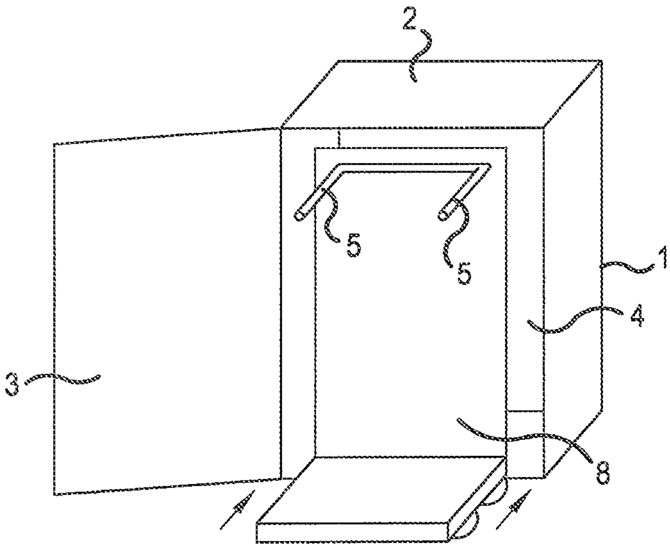
FIG. 12 illustrates a trash receptacle having independent rack/stand within the receptacle to create an enclosed two straight rod bag holding system according to an aspect of an embodiment of the present disclosure.
Figure 13:
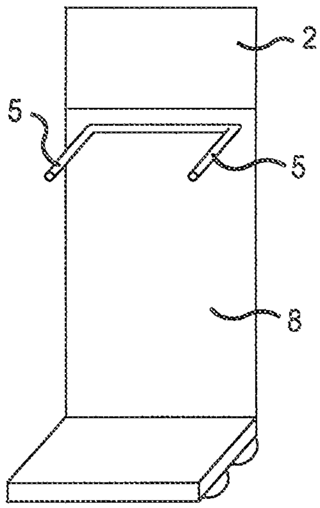
FIG. 13 illustrates a trash receptacle having two bar bag hanging rod rack/system/stand with a lid/top to create the enclosure of the bag according to an aspect of an embodiment of the present disclosure.

FIGS. 12 and 13 illustrate trash receptacle 1 having independent rack/stand 8 within receptacle 1 to create an enclosed bag holding system according to an aspect of an embodiment of the present disclosure. In one aspect of an embodiment of the present disclosure, a lid 2 may also be hingedly coupled or connected with frame 8 to cover any trash bags that may be installed. Bars or rods 5 may be directly connected or affixed to frame 8 which may also have a base with a sliding mechanism or wheels to enable frame 8 to slide or be wheeled out of receptacle 1.

Figure 14A:
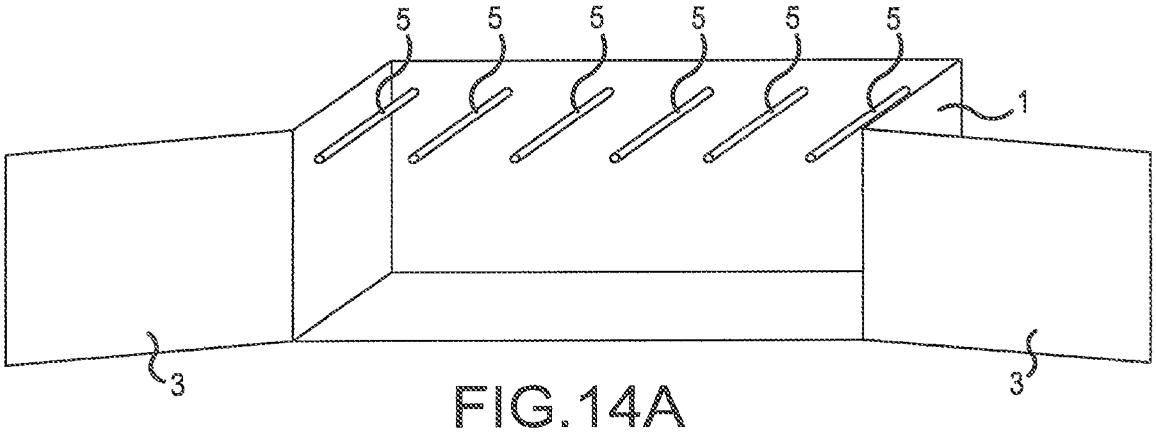
FIG. 14A illustrates a trash receptacle having multiple sets of two or more rods within a receptacle or cabinet allowing multiple bags to each hang on a two-rod system for various purposes such as recycling, trash, and compost all in one location according to an aspect of an embodiment of the present disclosure.
Figure 14B:
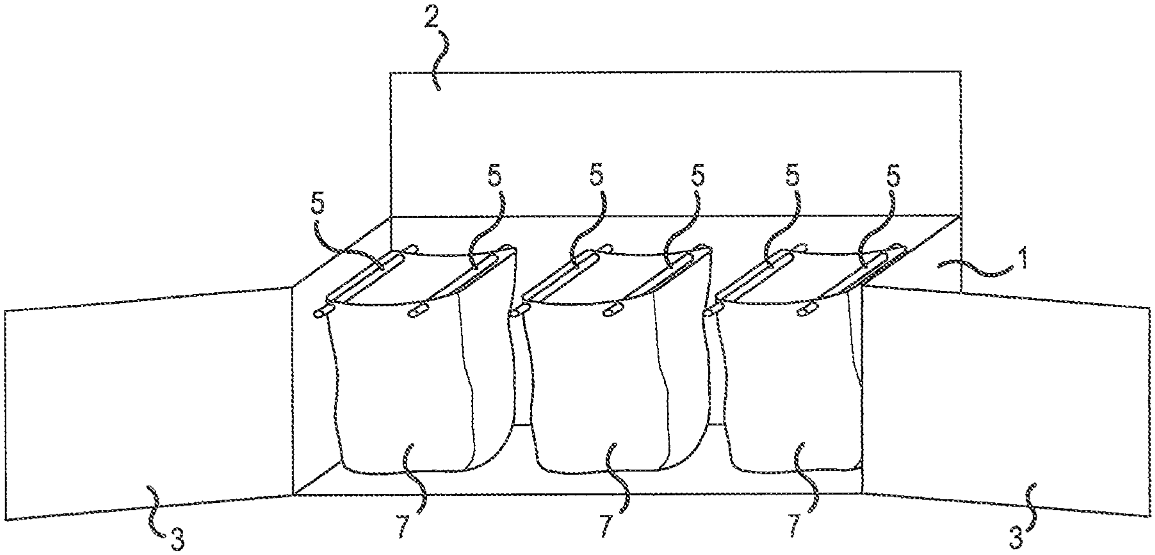
FIG. 14B illustrates a trash receptacle with optional lid(s) and having multiple sets of two or more rods within a receptacle or cabinet allowing multiple bags to each hang on a two-rod system for various purposes such as recycling, trash, and compost all in one location according to an aspect of an embodiment of the present disclosure.

Aspects of embodiments of the present disclosure contemplate pairs of bars or rods 5 being used within one compartment as shown in FIGS. 14A and 14B. These applications enable multiple bags 7 to each hang on each pair of bars or rods 5 for various purposes such as recycling, trash, and compost all in one location according to an aspect of an embodiment of the present disclosure.

Figure 15:
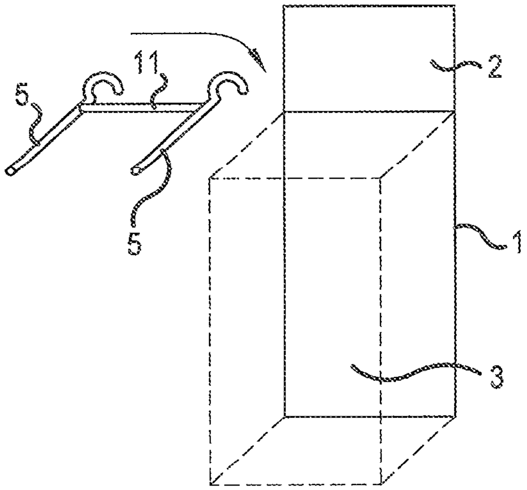
FIG. 15 illustrates a trash receptacle having a parallel bar hanger device/system according to an aspect of an embodiment of the present disclosure.

Another aspect of an embodiment of the present disclosure contemplates bars or rods 5 being part of a parallel bar hanger device/system according to an aspect of an embodiment of the present disclosure and as shown in FIG. 15. Here, the parallel bar hanger device/system may be detachable and may be used in conjunction with existing receptacles.

Figure 16:
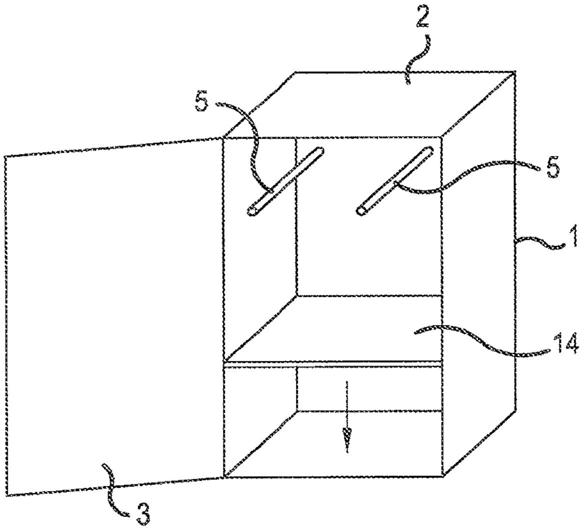
FIG. 16 illustrates a receptacle with a height adjustable base/floor according to an aspect of an embodiment of the present disclosure.
Figure 17:
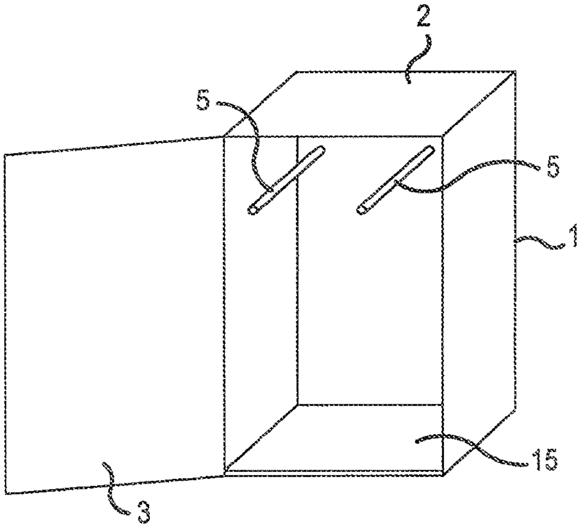
FIG. 17 illustrates a receptacle with an adjustable base that is in the depressed or lowered position according to an aspect of an embodiment of the present disclosure.

Another aspect of an embodiment of the present disclosure contemplates a height adjustable base/floor 15 within receptacle 1 as shown in FIGS. 16 and 17. Base/floor 15 may be elevated while in use. When the bag is full it can be lowered by a number of ways including pedal pushing, using your foot to depress it, etc. As base/floor 15 is lowered, the trash will then be able to sink down into the extra bag material that usually unfolds from the bottom of the bag at that time so there is more room to tie the top. This way the trash will not overflow while being removed from the bars and the bag material at the top will now be long enough to be tied.

Figure 18:
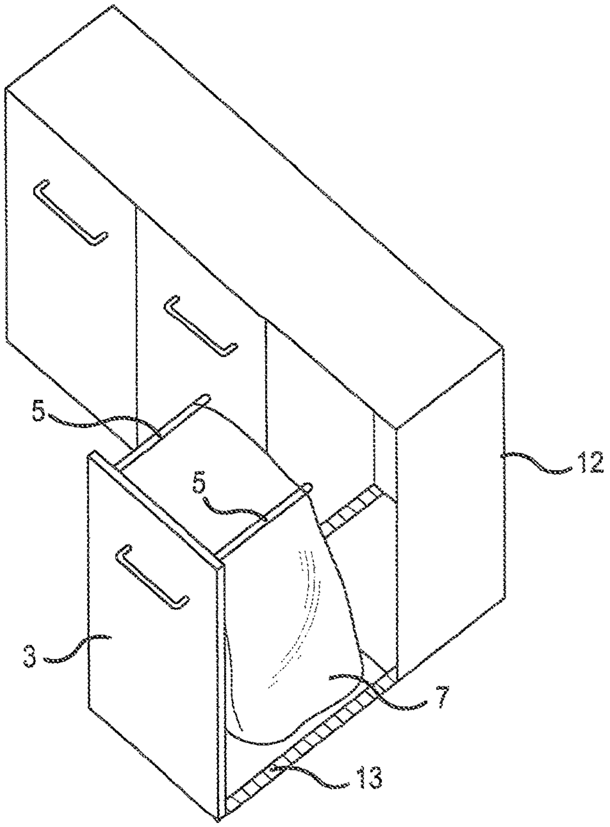
FIG. 18 illustrate a home, office, or work cabinet configured to become the receptacle according to an aspect of an embodiment of the present disclosure.
Figure 19A:
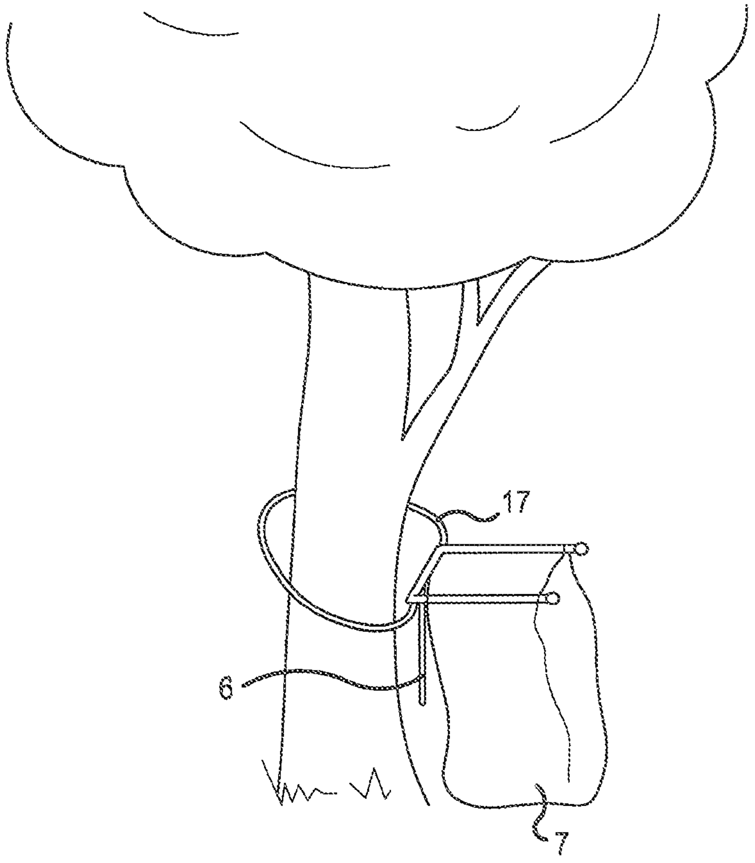
FIG. 19A illustrates a trash receptacle having two straight parallel bag holding bar device on a tree with a strap band to secure it around the tree according to an aspect of an embodiment of the present disclosure.
Figure 19B:
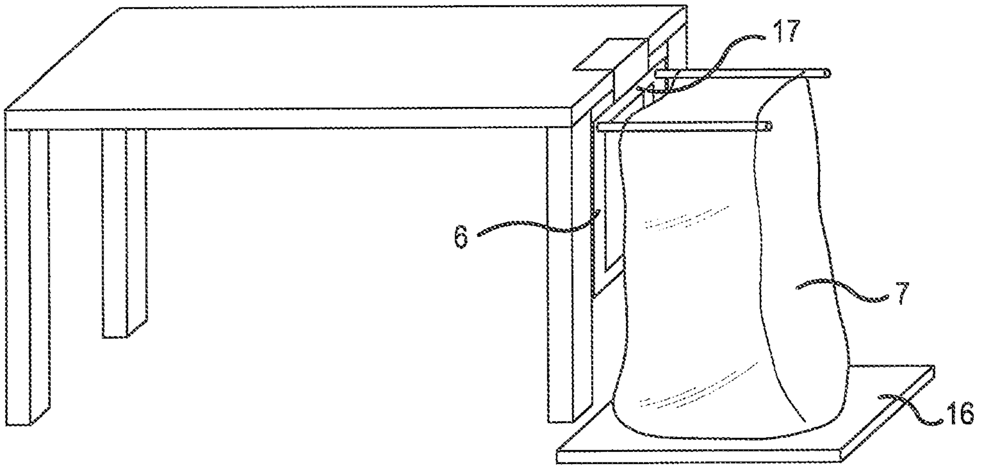
FIG. 19B illustrates a trash receptacle having two straight parallel bag holding bar device on a table secured with a clamp according to an aspect of an embodiment of the present disclosure.
Figure 19C:
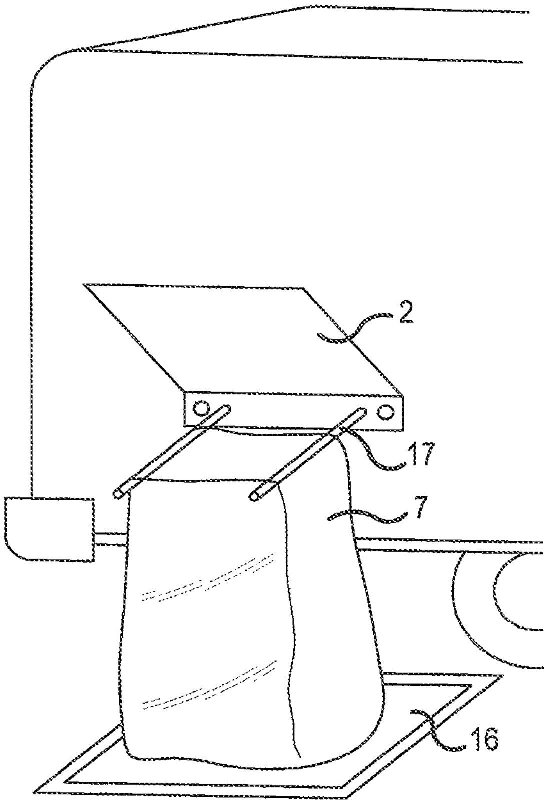
FIG. 19C illustrates a trash receptacle having two straight parallel bag holding bar device on a large vehicle secured with a magnet according to an aspect of an embodiment of the present disclosure.
Figure 19D:
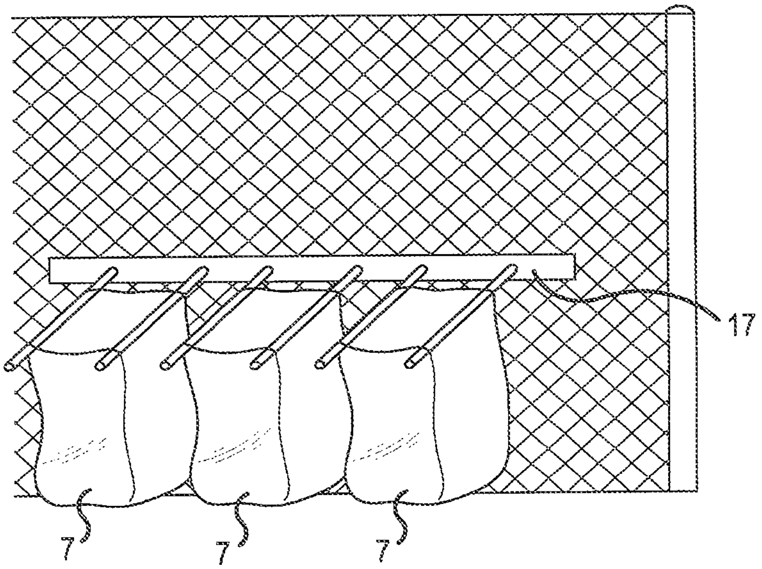
FIG. 19D illustrates a trash receptacle having two straight parallel bag holding bar device being used with multiple bar and bag option secured to a fence according to an aspect of an embodiment of the present disclosure.

Referring now to FIG. 18 home, office, or work cabinet 12 configured to become receptacle 1 is shown according to an aspect of an embodiment of the present disclosure. Cabinet (s) may be modified or made for the home or office environment in order to create an enclosed two bar or rod bag hanging system inside cabinet 12. Many kitchens for example have cabinetry made to hold a trash can that can slide open on a sliding door or drawer system. By attaching the rods 5 to the inside of the cabinet door 3 or inside that cabinet to any wall the user can load two bar or rod system style bags. Under many kitchen sinks people have a small bag rack or ring attacked to the inside of the door to hang bags around a rim in a circular style or hang them on special handles made for the grocery style bags to hang on. Unfortunately, they are not two parallel bars or rods long enough to use in this fashion. Bars or rods 5 can also be placed inside any type of home, office, etc. cabinet by any means including creating a special rack, frame, poles, track, etc. that can be purchased by the user and set in or attached inside of the cabinet. Any two bar or rod style system used inside of cabinets for the purposes of the present disclosure is included. Bars or rods 5 are not just for collection within garbage containers/receptacles as mentioned in the prior art. Rather, aspects of the present disclosure are configured and may work for the creative purpose of being placed inside general cabinetry to provide a two bar or rod bag system for people to use in custom home, office, or work locations as the users preferred convenient way of handling trash.

Further aspects of embodiments of the present disclosure are shown in FIGS. 19A through 19D showing installations of two straight parallel bag holding bar device 17 in different applications. This aspect offers consumers the option to have a two straight parallel bag hanging bar or rod device 17 with an optional lid 2 that is easily transported and installed. This device will be able to use two straight parallel bars or rods that may have minor curves and may have features that allow the bag to move smoothly and stay in various positions as described. The simple device can be made and assembled for use in various ways. It can have the bars or rods fold or collapse toward the center for compact storage. It can have pieces connect together by any means or be made as one complete piece. The two straight bars or rods can be created in many ways including creating them by bending longer bars or rods into an "L" shape or 90-degree angle to use one part to attach somewhere and the other portion to use to hang the bags on. The rear area that usually makes contact with the surface it attaches to may have features that allow it to hold on to or keep the bag stack in place neatly. The device may also be able to attach, for example, to the outside of food trucks by any means or any other surface by magnets, bolts, clip on, tie downs, welding, adhesives, hook and loop, screws, glue, twist on apparatus (es), threading, molding, hooks, suction device(s), snap on configuration, pinning, snap ring, nailing, hanging, pop in, it may be used with hinges and fold up almost flat while still attached to the surface and then unfold into the ready to use position when needed etc. For example, the owner can create an instant trash bag holder with lid if desired by simply attaching the device onto the outside of the truck exterior. The device can be used at a park by attaching it with a tie, clamp, or any other means to a tree. The device can also be attached to a door, end of a table with a clamp, onto an R.V. or object at a campsite, a railing or fence etc. by clipping it to the same. Device 17 can also be used at a construction site to collect trash by attaching it to wood beams, vehicles, outhouses, etc. Device 17 may be used in a garage on a wall to collect recyclables. Device 17 may be used at fairs, beaches, attached to a ground stake or other means to keep it stable. Device 17 may be attached to a diaper changing table or even by magnet to the side of a fridge in small homes. Device 17 is portable, small, and easy to install by any means and be readily available to meet the needs of any size crowd or event. The device can have an extension for example long hanging bars or rods that hang over the top of the door and lower the two parallel bag hanging bars or rods to the height the user prefers them at. The device may also include a lid and also a drip catch tray or pad if needed to ensure it can be enclosed to keep pests out and also not drip waste onto the ground. The device can be made of any material, size, color, and sell as a set of items listed here or individually as attachments or accommodating parts. Parallel bars or rods 5 can be made as one unit staying connected or be two rods in a set that are installed individually. Device 17 may have a long horizontal bar or rod or connecting piece with a few sets of bars or rods that extend out from it in order to allow multiple bags to hang from one device. Device 17 may be installed on any surface by a number of installation methods or ways.

Figure 20A:
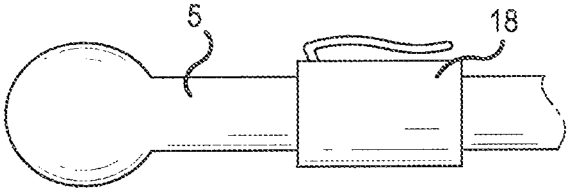
FIG. 20A illustrates a clip mechanism used on the receptacle's bars or rods according to an aspect of an embodiment of the present disclosure.
Figure 20B:
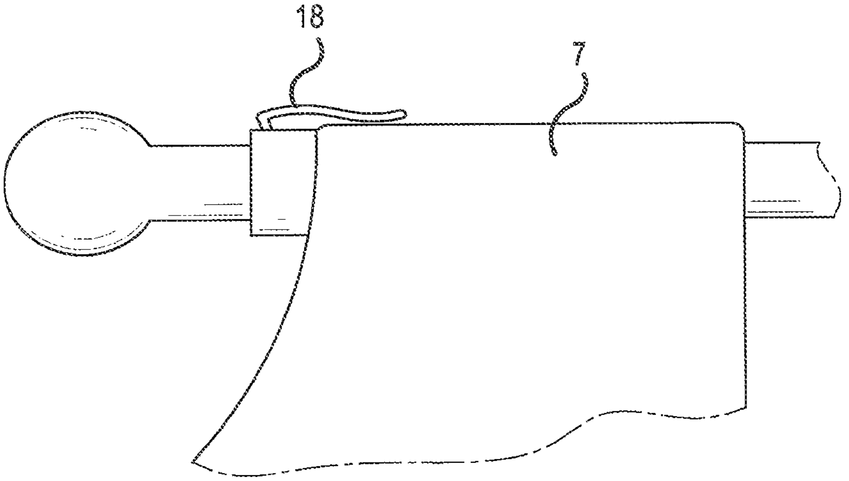
FIG. 20B illustrates a clip mechanism used on the receptacle's bars or rods and in operation with a trash bag according to an aspect of an embodiment of the present disclosure.

Referring now to FIGS. 20A and 20B, a clip mechanism 18 is shown on bars or rods 5 according to an aspect of an embodiment of the present disclosure. Each clip mechanism 18 may be located towards the free hanging end of bar or rod 5. As shown in FIG. 20B, clip mechanism captures the front end of a deployed trash bag 7 and holds it in place thereby prevent bag 7 from slipping off bars or rods 5. Once bag 7 is full, a user may then pull trash bag 7 over clip mechanism 18 and as each bag is connected with each other, a new bag is installed in place and captured by clip mechanism 18.

Figure 21:
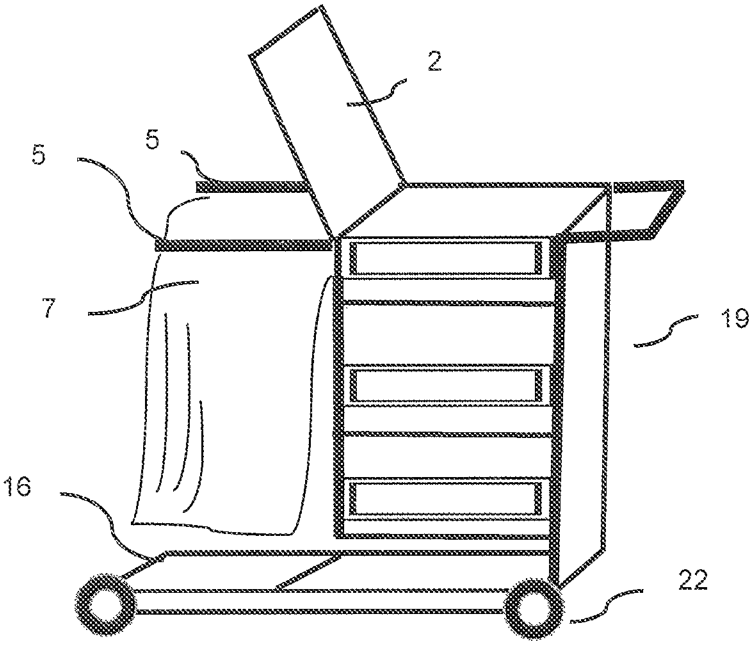
FIG. 21 illustrates a cart version of the independent frame assembly with additional space for storage of supplies according to an aspect of an embodiment of the present disclosure.

Referring now to FIG. 21, a cart version of an independent frame assembly with additional space for storage of supplies etc. 19 according to an aspect of an embodiment of the present disclosure. The independent frame assembly 19 may be configured such that the addition space for storage includes but is not limited to a cabinet, one or more drawers, one or more shelves, one or more compartments. The independent frame assembly 19 may comprise wheels 22, at least one open bag 7. The at least one open bag configured to fit on a pair bars or rods 5. The pair of bars or rods 5 having a horizontal orientation in a parallel configuration. The independent frame assembly 19 may further comprise and a lid 2 and a drip tray/pan 16. The independent assembly 19 may be configured as a cart having an independent frame assembly with additional space for storage of supplies. The independent frame assembly 19 may comprise wheels 22 or not comprise any wheels 22. Independent frame assembly 19 may further comprise a drip tray/pan 16. The drip tray/pan 16 may be configured to capture droppings, refuse, liquids, materials, contents, and the like.

The independent assembly 19 may be further comprise a set of at least one drawers. The set of at least one drawers may be configured such that one or more drawers may be vertically stacked in an aligned manner. The set of at least one drawers may comprise materials including but not limited to aluminum, iron, wood, vinyl, plastic, steel, other metals, composite materials, and other materials. The independent assembly 19 may be configured at various heights to accommodate a variety of uses.

Figure 22:
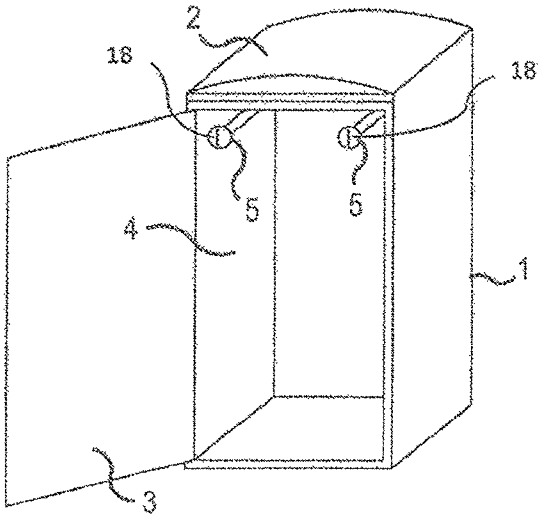
FIG. 22 illustrates a receptacle with a clip mechanism used on the tip of the receptacle's co-planar bars or rods according to an aspect of an embodiment of the present disclosure.

Referring now to FIG. 22, a receptacle 1, with an inside compartment 4, where inside the compartment 4 there is a clip mechanism 18 shown on the tip of each bar or rod 5 according to an aspect of an embodiment of the present disclosure. Each clip mechanism 18 may be located towards the free hanging end of bar or rod.

Figure 23:
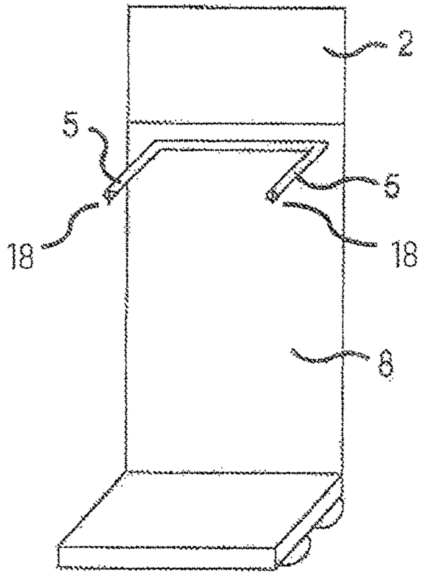
FIG. 23 illustrates an independent frame assembly receptacle with a clip mechanism used on the tip of the parallel horizontal bars.

Referring now to FIG. 23, an independent frame assembly receptacle 8 that has two or more parallel horizontal bars 5 with a clip mechanism 18 on the tips of the bars 5 according to the aspect of an embodiment to the present disclosure.

Figure 24:
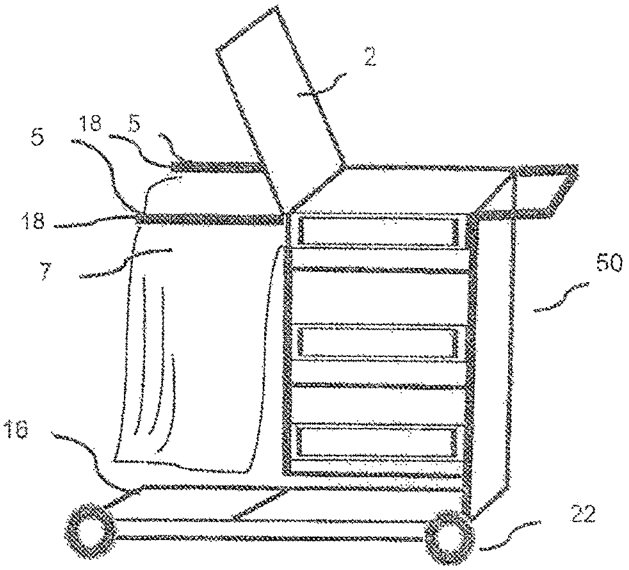
FIG. 24 illustrates a cart that has two parallel horizontal bars each having a clip mechanism located at the non-affixed end of each bar.

Referring now to FIG. 24, a cart 50, that has two parallel horizontal bars 5 and may have additional storage space that may be configured such that the addition space for storage includes but is not limited to a cabinet, one or more drawers, one or more shelves, one or more compartments. The cart 50 may comprise wheels 22, and may have at least one open bag 7. The at least one open bag configured to fit on a pair bars or rods 5. The pair of bars or rods 5 having a horizontal orientation in a parallel configuration. The cart 50 may further comprise and a lid 2 and a drip tray/pan 16. The set of at least one drawer may comprise materials including but not limited to aluminum, iron, wood, vinyl, plastic, steel, other metals, composite materials, and other materials. The cart 50 may be configured at various heights to accommodate a variety of uses.

Figure 25:
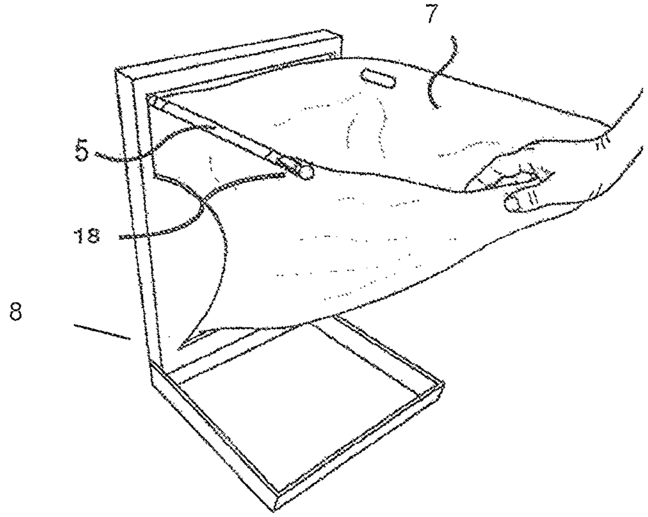
FIG. 25 illustrates a trash receptacle that is an independent frame assembly that has at least two parallel horizontal bars with a clip mechanism located near a free non-affixed end of each bar and at least one bag that has at least two holes to hang by on the bars.

Referring now to FIG. 25, an independent frame assembly receptacle 8 having two or more parallel horizontal bars 5 with clips 18 near the non-affixed part of the bars and at least one bag 7 on the bars.

The disclosure has been described in detail with particular reference to certain preferred embodiments thereof, but it will be understood that variations and modifications can be effected within the spirit and scope of the disclosure.

The invention claimed is:

1. A trash receptacle comprising: an independent frame assembly, wherein the independent frame assembly has at least two parallel horizontal bars, wherein the bars are structurally configured to receive and dispense bags by being secured at one end of the bars and free hanging at the other end of the bars, wherein the area between the secured end of the bars and the free hanging end of the bars is straight, smooth, and unobstructed for a bag to move along the bars without interference; and a clip mechanism located near a free non-affixed end of each bar and located on the tip of the bars, wherein each clip mechanism is configured to receive a bag so that the bag is pinched by the clip mechanism and the clip functions to prevent the bag from sliding off the bars or from collapsing inward.

2. The trash receptacle of claim 1 wherein one end of each bar is secured to the independent frame assembly and the free non-affixed each other end of each bar is free hanging.

3. The trash receptacle of claim 1 further comprising a lid.

4. The trash receptacle of claim 1 further comprising a drip tray.

5. The trash receptacle of claim 1 wherein the independent frame assembly further comprises one or more wheels.

6. The trash receptacle of claim 5 further comprising a lid.

7. The trash receptacle of claim 5 further comprising a drip tray.

8. The trash receptacle of claim 1 wherein the independent frame assembly further comprises a base having a track configured to perform at least one of: move the base along the track; and move the base along a path of a sliding mechanism.

9. The trash receptacle of claim 1 wherein the bars are structurally configured to hold bags in at least one or more configurations, wherein the one or more configurations is in a stack or inside a loaded package.

10. The trash receptacle of claim 1 wherein the bars are structurally configured to receive and dispense bags with one or more punch holes.

11. The trash receptacle of claim 1 wherein the receptacle may be enclosed by placing the receptacle within a cabinet.

12. The trash receptacle of claim 5 further comprising additional space to carry supplies as a cart.

13. The trash receptacle of claim 12 wherein the additional space comprises one of a cabinet, one or more drawers, one or more shelves, or one or more compartments.

14. The trash receptacle of claim 12 further comprising a lid.

15. The trash receptacle of claim 12 further comprising a drip tray.

16. A trash receptacle comprising: a cart, wherein the cart has at least two parallel horizontal bars, wherein the bars are structurally configured to receive and dispense bags by being secured at one end of the bars and free hanging at the other end of the bars, wherein the area between the secured end of the bars and the free hanging end of the bars is straight, smooth, and unobstructed for a bag to move along the bars without interference; and a clip mechanism located near a free non-affixed end of each bar and located on the tip of the bars, wherein each clip mechanism is configured to receive a bag so that the bag is pinched by the clip mechanism and the clip functions to prevent the bag from sliding off the bars or from collapsing inward, wherein the cart further comprises one or more wheels, further comprising additional space to carry supplies.

17. The trash receptacle of claim 16 wherein the additional space comprises one of a cabinet, one or more drawers, one or more shelves, or one or more compartments.

18. A collapsible bag dispensing apparatus, comprising; at least two parallel bars wherein the at least two parallel bars each have: one end that is able to affix to a surface, a non-affixed free hanging end, wherein the area between the secured end of the bars and the free hanging end of the bars is straight, smooth, and unobstructed for a bag to move along the bars without interference and a clip mechanism located near the non-affixed end of each bar and located on the tip of the bars, wherein each clip mechanism is configured to receive a bag so that the bag is pinched by the clip mechanism and the clip functions to prevent the bag from sliding off the bars or from collapsing inward.

19. The bag dispensing apparatus of claim 18 wherein the bars of the bag dispensing apparatus are placed configured to be oriented inside a cabinet, wherein the bag dispensing apparatus is configured to allow the cabinet to function as a receptacle.

20. The collapsible bag dispensing apparatus of claim 18 wherein the at least two bars are connected to a horizontal crossbar at the affixed end of each bar.

21. The bag dispensing apparatus of claim 20 wherein the horizontal cross bar is configured to be attached to any surface by at least one of: magnets, bolts, clip on, tie downs, welding, adhesives, hook and loop fasteners, screws, glue, twist on apparatus, threading, molding, hooks, suction device, snap on configuration, pinning, hanging, snap ring, nailing, and a pop in device.

22. The bag dispensing apparatus of claim 20 wherein the apparatus may be placed within a cabinet to create a receptacle.

23. The bag dispensing apparatus of claim 20 further comprising a drip tray.

* * * * *